(12) United States Patent
Ekin (10) Patent No.: US 11,320,829 B2
(45) Date of Patent: May 3, 2022

(54) BATTERY POWERED ARTIFICIAL INTELLIGENCE AUTONOMOUS PATROL VEHICLE

(71) Applicant: EKIN TEKNOLOJI SANAYI VE TICARET ANONIM SIRKETI, Istanbul (TR)

(72) Inventor: Akif Ekin, Istanbul (TR)

(73) Assignee: EKIN TEKNOLOJ: SANAYI VE TICARET ANONIM SIRKETI, Istanbul (TR)

( * ) Notice: Subject to any disclaimer, the term of this patent is extended or adjusted under 35 U.S.C. 154(b) by 0 days.

(21) Appl. No.: 16/777,905

(22) Filed: Jan. 31, 2020

(65) Prior Publication Data
US 2021/0243410 A1  Aug. 5, 2021

(51) Int. Cl.
*G05D 1/00* (2006.01)
*G06V 20/40* (2022.01)
(Continued)

(52) U.S. Cl.
CPC ......... *G05D 1/0231* (2013.01); *G05D 1/0088* (2013.01); *G05D 1/0257* (2013.01); *G05D 1/0278* (2013.01); *G06V 20/40* (2022.01); *G06V 20/56* (2022.01); *G08B 25/014* (2013.01); *B60Q 1/46* (2013.01); *G05D 2201/0207* (2013.01); *G06V 20/44* (2022.01); *H04N 5/2253* (2013.01)

(58) Field of Classification Search
None
See application file for complete search history.

(56) References Cited

U.S. PATENT DOCUMENTS 7,504,965 B1 *  3/2009  Windover ............ G08G 1/0175
                                              382/105
9,632,502 B1 *  4/2017  Levinson ................ H04L 67/12
(Continued)

FOREIGN PATENT DOCUMENTS

CN      108255181 A  *  7/2018  ........... G01C 21/206
GB        2568306 A  *  5/2019  ........... G01C 21/206

OTHER PUBLICATIONS

Machine translation of CN 108255181A (Year: 2018).*

*Primary Examiner* — Tyler W. Sullivan
(74) *Attorney, Agent, or Firm* — Bayramoglu Law Offices LLC (57) ABSTRACT

A battery powered artificial intelligence autonomous patrol vehicle. The vehicle is battery powered and is operated autonomously using artificial intelligence. The autonomous patrol vehicle includes a surveillance or detection system on or within an emergency light bar of the autonomous patrol vehicle. The autonomous patrol vehicle autonomously performs patrol surveillance or detection functions such as speed; red-light; and traffic enforcement; traffic enforcement with Automatic License Plate Recognition (ALPR), face recognition, animal recognition, object recognition, video surveillance and online continuous analysis and any equivalent surveillance or detection functions. The autonomous patrol vehicle stores and sends live and/or stored data to a command control center while moving or parked. The surveillance or detection system navigates with the use of any one of or a combination of a camera, radar and Light Detection and Ranging (LIDAR) sensors and can operate by viewing 360 degrees.

10 Claims, 4 Drawing Sheets

(51) Int. Cl.
    *G06V 20/56*     (2022.01)
    *G05D 1/02*     (2020.01)
    *G08B 25/01*     (2006.01)
    *B60Q 1/46*     (2006.01)
    *H04N 5/225*     (2006.01)

(56) References Cited

U.S. PATENT DOCUMENTS

| | | | | |
|---|---|---|---|---|
| 9,928,737 | B2 * | 3/2018 | Ekin | G01S 13/867 |
| 9,946,734 | B2 * | 4/2018 | Ekin | G06K 9/00791 |
| 10,233,021 | B1 * | 3/2019 | Brady | G05D 1/0282 |
| 10,235,877 | B1 * | 3/2019 | Ellis | G01S 13/867 |
| 10,692,304 | B1 * | 6/2020 | Deyaf | G08G 1/20 |
| 10,789,835 | B2 * | 9/2020 | Kislovskiy | G08G 1/096816 |
| 10,946,793 | B1 * | 3/2021 | Ekin | G06K 9/00825 |
| 2016/0132743 | A1 * | 5/2016 | Ekin | G03B 17/02 |
| | | | | 382/105 |
| 2017/0308082 | A1 * | 10/2017 | Ullrich | G05D 1/0061 |
| 2018/0025636 | A1 * | 1/2018 | Boykin | G06K 9/00335 |
| | | | | 701/1 |
| 2018/0050800 | A1 * | 2/2018 | Boykin | G10L 25/51 |
| 2018/0158153 | A1 * | 6/2018 | Ekin | G06Q 10/06315 |
| 2018/0301031 | A1 * | 10/2018 | Naamani | G08G 1/096861 |
| 2018/0349834 | A1 * | 12/2018 | Heinla | G06Q 10/083 |
| 2020/0008059 | A1 * | 1/2020 | Fox | H04W 12/122 |
| 2020/0031248 | A1 * | 1/2020 | Kwak | B60L 53/65 |
| 2020/0073401 | A1 * | 3/2020 | Szatmary | G05D 1/0077 |

\* cited by examiner

BATTERY POWERED ARTIFICIAL INTELLIGENCE AUTONOMOUS PATROL VEHICLE

TECHNICAL FIELD

The present disclosure relates to a battery powered artificial intelligence autonomous patrol vehicle. More specifically, the present disclosure relates to a battery powered electric patrol vehicle which is operated autonomously using artificial intelligence (AI). Additionally, the present disclosure relates to an autonomous driving unmanned patrol vehicle system which provides security and smart city controls by detecting and recognizing people, animals, vehicles, vehicle license plates and objects. The autonomous driving unmanned patrol vehicle system also measures air quality, analyzes sounds, performs traffic management with real time alerts, performs accident and incident detection, provides accurate scene analysis and understands and performs speed segmentation and speed recognition by using a plurality of cameras, sensors and other equivalent detective and surveillance devices.

BACKGROUND

The existence of autonomous vehicles is known. With the development of today's technology, autonomous vehicles are being developed and their use is becoming widespread. Some major facets of the development of autonomous vehicles is to prevent accidents caused by human errors and to provide a comfortable journey for passengers. However, in current autonomous vehicles, there is no system that controls the environment by means of devices such as image acquisition devices and sensors that ensures safety for the environment with a smart city or other geographical locations/areas.

Therefore, there is a need for a system which detects security and performs smart city and geographical locations/areas controls by detecting and recognizing persons, animals, vehicles, vehicle license plates and objects.

The system, using a plurality of cameras, sensors and/or other equivalent detection and surveillance devices, also measures air quality, analyzes sounds, performs traffic management with real time alerts, performs accident and incident detection, provides accurate scene analysis and understands and performs speed segmentation and speed recognition. Additionally, the system informs security teams in case of a possible danger by means of security equipment placed in an autonomous vehicle which is to be located at predetermined routes and/or locations at predetermined times.

Currently, patrol vehicles, such as police cars and security vehicles, are operated by an individual and the car or vehicle is typically powered by an internal combustion engine. Since the patrol vehicle is typically operated by an individual, the surveillance or detection of an object, person or device in a particular area is limited since an individual cannot continuously monitor the particular area due to fatigue and work requirements and it is not practical or economical to have an individual or individuals inside a vehicle monitoring such a particular area for days or even weeks. Also, the security systems used today are installed in a fixed place at predetermined positions and these security systems are aimed to provide security by detecting vehicles and/or people as non-descriptive images within the fixed area. Due to the control of certain points within the fixed security systems, the efficiency of these fixed security systems is low.

Therefore, manned patrol vehicles trying to identify any suspicious situation, adding safety to a region or surveillance and/or detection of an object, person or device in a particular area is not feasible.

A specific type of traffic surveillance system is a speed enforcement system. Currently, speed enforcement systems are either fixed or mobile. However, some surveillance or detection systems need to be carried or transported to a certain location or area and then fixedly positioned there to operate for a certain period of time. This type of surveillance or detection system is considered to be semi-mobile.

Cities, workplaces, university campuses, airport parking lots, shopping mall parking lots and similar type of areas need to be patrolled in order to identify the location of parked cars or vehicles. Currently manned vehicles scan these areas in order to determine the exact location of parked cars or vehicles. Additionally, shopping malls or similar areas are searched manually or have a fixed surveillance system for searching for lost children.

From the above plurality of different surveillance or detection needs, there is need for an autonomous patrol vehicle to safely, quickly, efficiently and economically provide surveillance or detection of arduous situations and for very long time periods. Additionally, there is a need for a mobile system that can monitor different environments.

SUMMARY

An object of the present invention is to provide a solution to a manned patrol vehicle. The present disclosure describes an autonomous patrol vehicle which provides surveillance or detection of arduous situations and for very long time periods. The autonomous patrol vehicle also provides safety to the public, operates fast and efficiently as well as is economical in time, cost and manpower to the organization using the autonomous patrol vehicle.

Another object of the present invention is to provide an autonomous unmanned driving system for a patrol vehicle, where the patrol vehicle collects data with an environment and/or other geographical locations/areas using units such as an image acquisition device, sensors, cameras, radar and/or LIDAR sensors and a position detection device which are provided/located on the patrol vehicle.

Another object of the present invention is to provide a system which is placed in security devices and/or an autonomous unmanned vehicle and provides detection of people, vehicles and any and all objects in the vicinity of the vehicle and provides a warning when a possible match is achieved by comparing the detected person and/or vehicle(s) with the records of a security database.

Another object of the present invention is to detect traffic violations by using at least one sensor placed in the security/patrol vehicle, to detect traffic violations, to automatically detect license plate and vehicle information, to send traffic violations to a central database and to generate traffic violations automatically.

For example, a pedestrian, driver, vehicle and/or vehicle license plate can be detected or a pedestrian, driver, vehicle can be detected by taking an image of the person or object detected with an autonomous driving feature which is provided to an operator in a predetermined route and/or position at a predetermined time. Another example is the autonomous security vehicle system provides security information of the license plate by having at least one image receiving device placed in any region of the vehicle and provides the image of the vehicle environment. The vehicle also comprises at least one positioning device which enables the momentary position of the vehicle to be determined and the vehicle obtains images of the vehicles surroundings by taking and processing images received by the at least one imaging device.

An embodiment of the present disclosure is a battery powered electric patrol vehicle which is operated autonomously using artificial intelligence. The surveillance or detection systems and the autonomous patrol vehicle can be powered by only using batteries (i.e. the vehicle and systems are not powered with any other fuel or internal combustion engine, including gas, diesel or equivalent fuel).

The autonomous patrol vehicle autonomously performs all patrol surveillance or detection functions such as speed, red-light and traffic enforcement; traffic enforcement with Automatic License Plate Recognition (ALPR), face recognition; animal recognition; object recognition; video surveillance and online continuous analysis; and any equivalent surveillance or detection functions. The autonomous patrol vehicle stores and sends live and/or stored data to a command control center while moving or while parked.

The autonomous patrol vehicle performs all patrol smart functions autonomously while moving or while parked on a roadside or other stationary or non-stationary structure(s).

The surveillance or detection system navigates with the use of any one of or a combination of a camera, radar and Light Detection and Ranging (LIDAR) sensors.

The surveillance or detection system can operate by viewing 360 degrees.

The surveillance or detection system performs surveillance, face recognition, object recognition, animal recognition, sound recognition and can recognize and determine a car's brand; make; and color as well as determine a car's vehicle classification such as a car, a truck, a semi-truck, a sports utility vehicle (SUV) or any other classification or type of vehicle.

The surveillance or detection system can store and process all types of stored or live data using artificial intelligence (AI). The built in AI system is trained to use all the sensor data to drive autonomous in defined areas. All this data is used to feed the AI system as training data for learning and to continuously improve the autonomous drive feature and capabilities. Built into the surveillance or detection system are live data, video streaming, remote access over Wi-Fi™ (wireless network protocols)/LTE™ (wireless broadband communication for mobile devices and data terminals)/3G™ (third generation of wireless mobile telecommunications technology)/4G™ (fourth generation of broadband cellular network technology)/5G™ (fifth generation technology standard for broadband cellular networks) and similar communications. The surveillance or detection system uses a Global Positioning System (GPS) or similar for determining an exact geolocation.

It is known that artificial intelligence (AI) uses computers, microprocessors, chips, software, computer/software programs, memory and/or databases to make decisions using data and algorithms and to control functions and operations of devices via controllers, sensors and other equivalent devices and apparatus. For example, artificial intelligence (AI) can be used to operate an autonomous unmanned vehicle and surveillance or detection systems installed in the autonomous unmanned vehicle Additionally, the surveillance or detection system designed is installed on or within an emergency light bar of the autonomous patrol vehicle or any police, patrol or surveillance vehicle so as to clearly and visibly make the public aware this vehicle is an emergency responder vehicle.

The size of the autonomous patrol vehicle is small enough to be carried on a light truck/transporter for long range transportation. For short range transportation and patrolling, the autonomous patrol vehicle is self-deployed from a command control center or any desired starting location or position. The size of the autonomous patrol vehicle is also small enough to be moved or parked on the side of a road or even a large pavement area.

The autonomous patrol vehicle is designed with a fast-re-chargeable battery system.

BRIEF DESCRIPTION OF THE DRAWINGS

In order to more clearly illustrate the embodiments of the present disclosure, a brief description of the drawings is given below. The following drawings are only illustrative of some of the embodiments of the present disclosure and for a person of ordinary skill in the art, other drawings or embodiments may be obtained from these drawings without inventive effort. Therefore, the embodiments, drawings and detailed disclosure do not limit the scope of the invention but rather provide a clear disclosure of the disclosed embodiments.

DETAILED DESCRIPTION

The technical solutions of the present disclosure will be clearly and completely described below with reference to the drawings. The embodiments described are only some of the embodiments of the present disclosure, rather than all of the embodiments. All other embodiments that are obtained by a person of ordinary skill in the art on the basis of the embodiments of the present disclosure without inventive effort shall be covered by the protective scope of the present disclosure.

In the description of the present disclosure, it is to be noted that the orientational or positional relation denoted by the terms such as "center", "upper", "lower", "left", "right", "vertical", "horizontal", "inner" and "outer" is based on the orientation or position relationship indicated by the figures, which only serves to facilitate describing the present disclosure and simplify the description, rather than indicating or suggesting that the device or element referred to must have a particular orientation, or is constructed or operated in a particular orientation, and therefore cannot be construed as a limitation on the present disclosure. In addition, the terms "first", "second" and "third" merely serve the purpose of description and should not be understood as an indication or implication of relative importance.

In the description of the present disclosure, it should be noted that unless otherwise explicitly specified and defined, the terms "install", "link" and "connect" shall be understood in the broadest sense, which may, for example, refer to fixed connection, detachable connection or integral connection; may refer to mechanical connection or electrical connection; may refer to direct connection or indirect connection by means of an intermediate medium; and may refer to communication between two elements. A person of ordinary skill in the art would understand the specific meaning of the terms in the present disclosure according to specific situations.

The present disclosure of the autonomous patrol vehicle 100 and the surveillance and detection systems are described in detail below in reference to the figures.

The apparatus, elements, structural devices and components of the autonomous patrol vehicle and the surveillance and detection systems may be fabricated from any suitable material including, but not limited to, alloys, metals, steel, aluminum, composites, wood or plastic(s). Also, the apparatus, elements, structural devices and components of the autonomous patrol vehicle and the surveillance and detection systems may be fabricated using any suitable technique including, but not limited to, stamping, forging, molding, machining, additive processes, or welding.

FIGS. 1-4 illustrates the present invention of an autonomous patrol vehicle 100 and units of the surveillance and detection systems.

The autonomous patrol vehicle 100 automatically performs a plurality of surveillance and detection functions of a typical police officer such as speed enforcement, traffic sign and traffic light enforcement, vehicle moving enforcement, Automatic License Plate Recognition (ALPR). Additionally, the autonomous patrol vehicle can also automatically perform face recognition, animal recognition, object recognition, video surveillance, online continuous analysis, vehicle recognition such as make, model and color of the vehicle, vehicle classification such as a car, a truck, a semi-truck, a sports utility vehicle (SUV) or any other classification or type of vehicle and sound recognition. The autonomous patrol vehicle can perform all of the above surveillance and detection functions while moving or while being parked. Therefore, the autonomous patrol vehicle can patrol and provide surveillance and detection functions, within any desired area, twenty-four hours a day and seven days a week at a very low cost to the organization using the autonomous patrol vehicle.

The autonomous patrol vehicle is battery powered and can be solely battery powered, which means no other fuel or internal combustion engine, including gas and diesel, powers the autonomous patrol vehicle 100. The autonomous patrol vehicle is based on artificial intelligence (AI).

The artificial intelligence (AI) collects data from all sensors, cameras and all other surveillance and detection devices within the autonomous patrol vehicle 100. Software controls steering, throttle, braking and all navigation functions of the electrical engine of the autonomous patrol vehicle 100. Collected data from all sensors, cameras and all other surveillance and detection devices are refined with artificial intelligence AI to control software which controls the autonomous patrol vehicles movements, speed, direction, steering and navigation.

Figure 1:
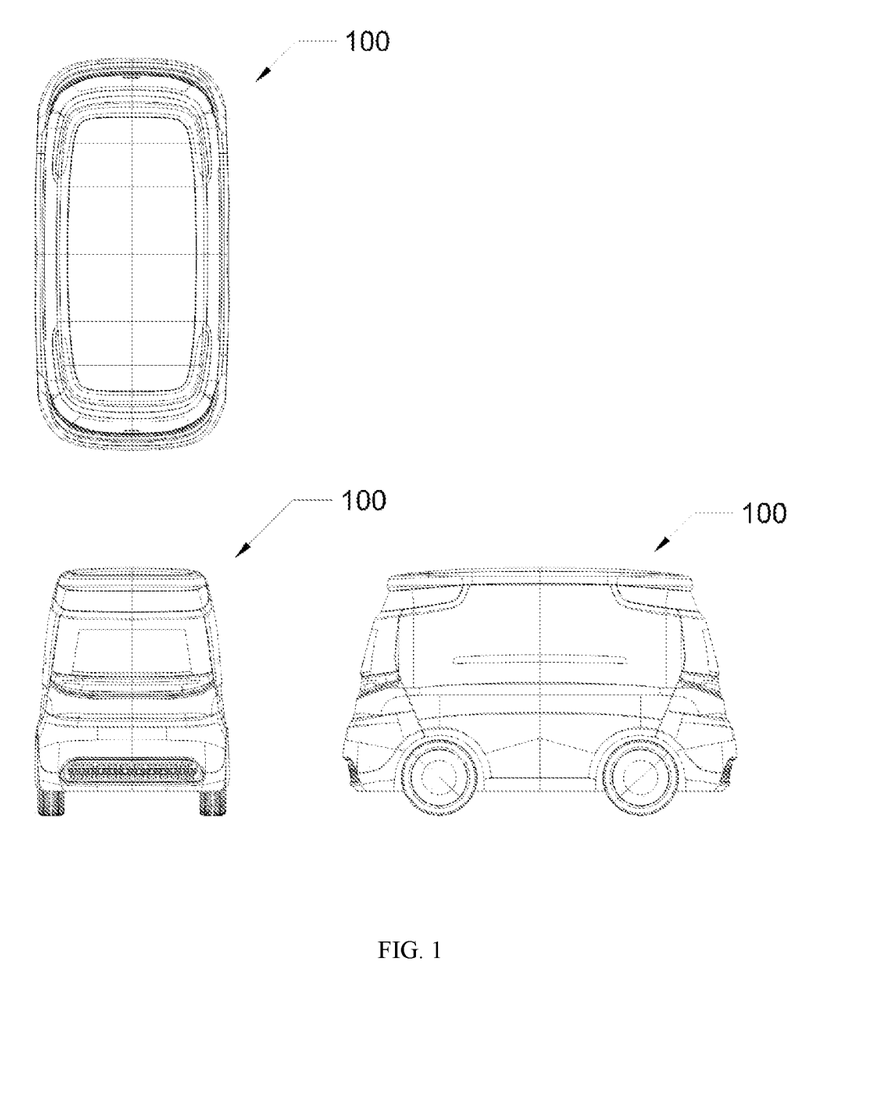
FIG. 1 is an end, side and top view of the autonomous patrol vehicle and the surveillance or detection systems.
Figure 2:
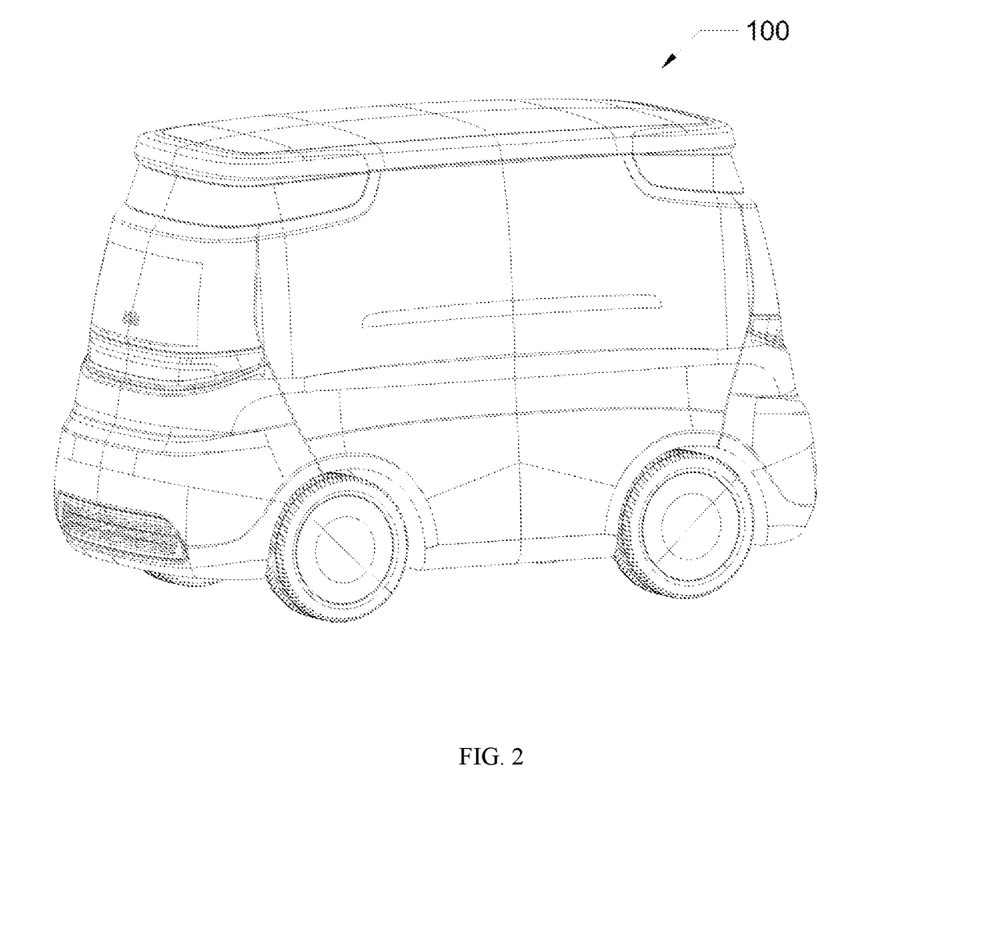
FIG. 2 is a perspective view of the autonomous patrol vehicle.
Figure 3:
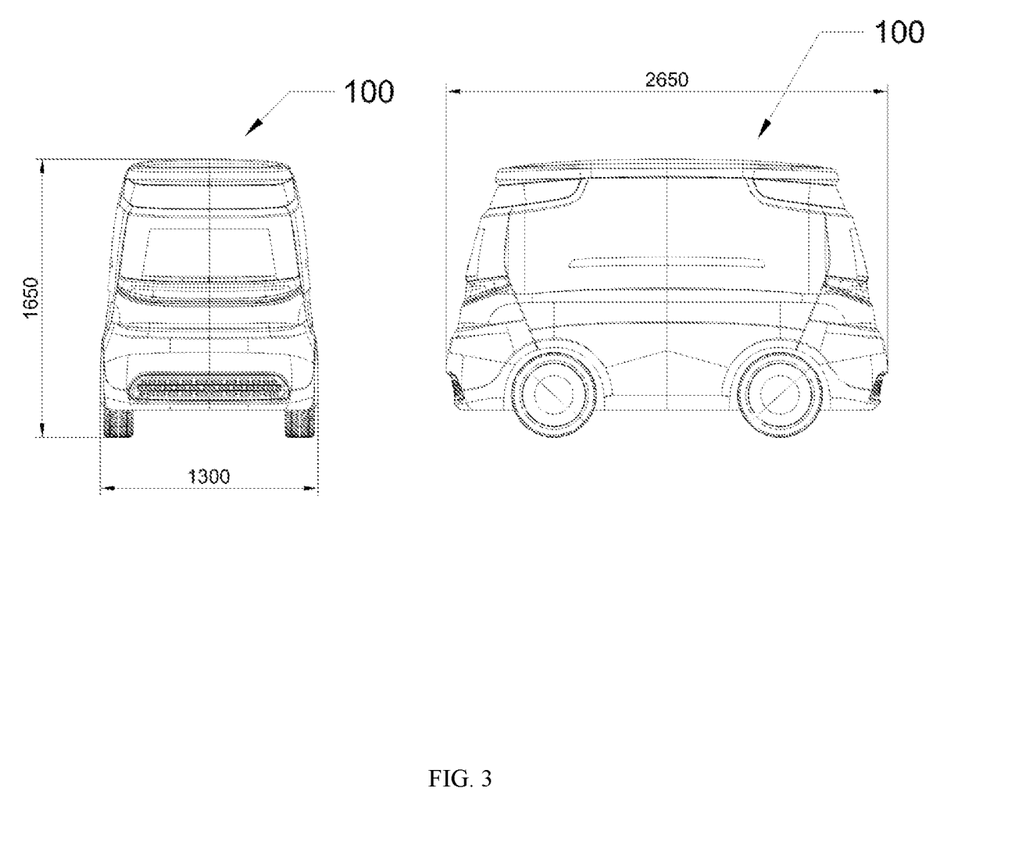
FIG. 3 is a detailed end and side view of the autonomous patrol vehicle.
Figure 4:
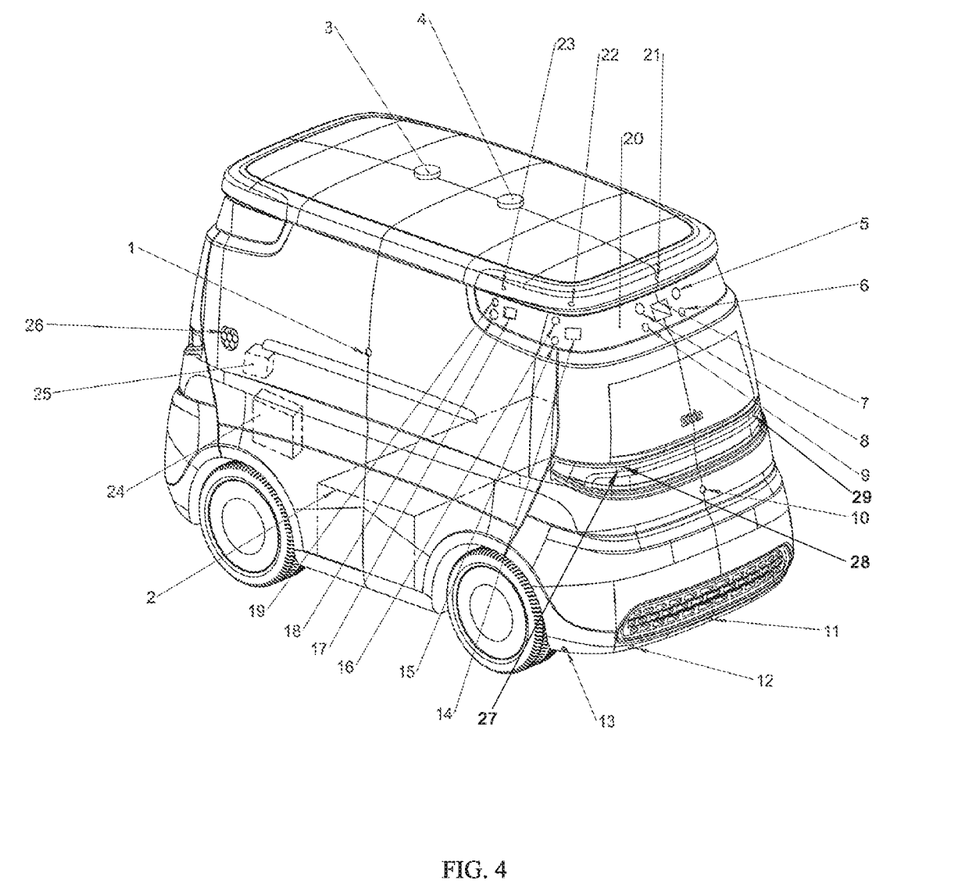
FIG. 4 is a perspective side view of units of the surveillance and detection systems in the autonomous patrol vehicle.

As shown in FIG. 4, the surveillance and detection systems are comprised of any one of or a combination of a video cameras 1,6,9,10,15,16,19 or cameras, radar and/or a Light Detection and Ranging (LIDAR) sensors 7,14,17. Battery block 2, Video cameras 1,6,9,10,15,16,19 can be used for the detection and surveillance of objects, people, animals, vehicle type, traffic sign recognition and other equivalent objects, things and persons. Sensors 5, 8, 15, 18 can be used for are used for Automatic License Plate Recognition (ALPR) 27, face, road animal, pedestrian, vehicle and object detection and recognition. Short range sensors 11,12,13 are used for close range navigation and autonomous driving of the autonomous patrol vehicle 100. Infrared illumination system 20 is used for day and night detection and surveillance. Microphones 21,22,23 installed in the autonomous patrol vehicle 100 can detect sounds within a 360-degree radius of the autonomous patrol vehicle 100. AI Processor or processors with modem 24 is processing all the data from the sensors making it to valuable information for autonomous driving and communication. All video cameras communicate with are in connected to AI processors. The surveillance and detection systems can store and process all types of data such as images, text, video, live video and streaming video. Additionally, the surveillance and detection systems has built in live data, life data, video streaming and remote access over wireless communication systems such as Wi-Fi™ (wireless network protocols), Long Term Evolution (LTE™)(wireless broadband communication for mobile devices and data terminals), 3G™ (third generation of wireless mobile telecommunications technology), 4G™ (fourth generation of broadband cellular network technology), 5G™ (fifth generation technology standard for broadband cellular networks) or any other equivalent wireless or wired communication systems.

A global positioning system (GPS) or equivalent 3 is used in the surveillance and detection systems to obtain an exact geolocation of a person, object or device.

The surveillance and detection systems are installed and/or mounted on an emergency light bar or other surface of the autonomous patrol vehicle. Installing the surveillance and detection systems on the emergency light bar of the autonomous patrol vehicle will make the autonomous patrol vehicle be clearly visible as an emergency responder type of vehicle.

The surveillance and detection systems can operate by viewing 360 degrees.

The size of the autonomous patrol vehicle can be small enough to be carried on a small/light truck. For example, the length of the autonomous patrol vehicle may be 2.65 meters, the height of the autonomous patrol vehicle may be 1.65 meters and width of the autonomous patrol vehicle may be 1.3 meters. However, the length, height and width of the autonomous patrol vehicle can have smaller or larger values than the values disclosed in the above example. Also, the size of the autonomous patrol vehicle can be small enough to be parked in any vehicle parking space or to be parked on the side of a road or other equivalent surface or area.

For long range transportation and patrolling, the autonomous patrol vehicle can be carried on a light truck/transporter. For short range transportation and patrolling, the autonomous patrol vehicle is self-deployed from a command control center or any desired starting location or position.

The autonomous patrol vehicle 100 is designed with a fast battery charging system 25 and charging inlet/port 26.

A built-in speaker and/or microphone system allows the autonomous patrol vehicle to communicate remotely with a command control center or any desired location or site. This remote communicate between the command control center and the autonomous patrol vehicle can be fully automated because of the autonomous patrol vehicles built in AI. This remote communicate can help people in immediate need or trouble and can immediately alert any authority or first responder of hazards, risks and warnings of unauthorized access or emergency situations.

Uses and Operation of the autonomous patrol vehicles surveillance and detection systems.

In large parking areas, a customer may forget where he or she parked the car. The autonomous patrol vehicles surveillance and detection systems scans this parking area in a certain routine and automatically reads license plates, recognizes the car color, make and brand along with the exact location and stores and/or sends these read data to the central database. Therefore, a lost car can be found in seconds. Any mobile application can access this data, or this data can be linked with a parking management system.

In very large areas such as exhibitions, entertainment parks, shopping malls and similar areas children may become lost and separated from their parents. The autonomous patrol vehicles surveillance and detection systems scans and recognizes related faces and stores and/or sends this face data to a central database. Therefore, a lost child can be found in seconds. Any mobile application can access this data.

In high risk areas, such as a special event or high-risk situation certain faces and/or persons may be searched. The autonomous patrol vehicle, while moving, uses the surveillance and detection systems to automatically scan all faces in the risk areas and gives an alert if a person is on a list such as a blacklist. The type of the alert and the location of the alert can be configured individually.

If a cat or dog is lost, it is difficult to obtain any information where the cat or dog has been last seen. The autonomous patrol vehicles surveillance and detection systems allows the user to search for cats and/or dogs in any area of interest providing a geolocation and time data.

A speed enforcement system can be performed in the form of mobile, fixed or semi-mobile. The surveillance or detection systems, positioned on the autonomous patrol vehicle, and is carried or transported to a certain location or area, and then positioned at this location to operate for a certain period of time is considered to be semi-mobile. For example, in a semi-mobile operation, the speed enforcement system is carried to a certain location and is position at this location for many days or months without moving. Or it could itself position close to a school or similar during certain hours and move autonomously to another nearby location with need for enforcement for securing the area. Therefore, this semi-mobile enforcement system is dynamic and flexible for the user. If the semi-mobile enforcement system is equipped with enough batteries, the system will operate for many weeks without being re-charged. With this new solution, the system can ensure safe traffic by operating during school hours in the area of interest and then autonomously moved to another location for traffic enforcement, ALPR, face or object recognition.

The built in AI can provide gun detection, threat detection, loud noises, sound detection, and recognize abnormal behavior. These detections and recognitions will provide, to a selected first responder, an automated alarm with a live video feed and a two-way audio so the first responder can immediate be deployed and respond accordingly. An example can be accidents on highways and roadways. The autonomous patrol can accommodate, charge and serve as platform for drones for fastest possible first response or situation awareness. Therefore, the autonomous patrol vehicle can carry essential first aid equipment for first responders and can provide awareness of the current, ongoing and past situations before the first responders arrive at the scene.

The autonomous patrol vehicles surveillance and detection systems scans the city with smart sensors for air-quality 28, sound 29, radiation and similar detections. Therefore, the autonomous patrol vehicles surveillance and detection systems obtain data such as dynamic air quality, sound quality, suspicious and/or dangerous sounds such as a gunshot, radiation, and a weather map.

The autonomous patrol vehicle can automatically navigate to its own charging base or any other defined charging base for re-charging of the batteries via the vehicles GPS or similar positioning system. The charging base to our fixed or spotter system can work in one eco-system.

Finally, it should be noted that the above embodiments are only used to illustrate the technical aspects of the present disclosure, rather than limit the embodiments. Although the present disclosure has been described in detail with reference to the foregoing embodiments, it should be understood by a person of ordinary skill in the art that the technical aspects described in the embodiments can still be modified or equivalent substitutions can be made to some or all of the technical features and the modifications or substitutions would not change the substance of the scope of the embodiments of the present disclosure.

What is claimed is:

1. A surveillance and detection system comprising:
   an autonomous patrol vehicle, wherein the autonomous patrol vehicle includes an emergency light bar;
   at least one memory;
   an infrared illumination system;
   smart sensors;
   a global positioning system (GPS) used to obtain a geolocation of a person, an object or a device;
   at least one microphone;
   at least one video camera coupled to a processor;
   a built-in live video feed and a two-way audio system that provides an automated alarm to a first responder, and
   a parking management system;
   wherein the smart sensors, the at least one video camera and processor, and the at least one microphone are configured to detect gunshots and a license plate of a car;
   wherein, when the gunshots are detected, the processor provides the automated alarm with the built-in live video feed and two-way audio to the first responder;
   wherein the autonomous patrol vehicle is configured to patrol a predetermined route in a parking area and when a license plate is detected, the processor recognizes a color, make, and brand of a car, license plate information of the car, and location information of the car from the GPS and sends the location information and the license plate information to a central database;
   wherein the location information and the license plate information locate a target car in seconds when a parking area user searching for the target car submits a request to the central database.

2. The surveillance and detection system according to claim 1, wherein the surveillance and detection system is configured to operate while the autonomous patrol vehicle is stopped, parked or in motion.

3. The surveillance and detection system according to claim 1, wherein the processor of the autonomous patrol vehicle stores and/or sends real-time collected from the surveillance and detection system to a command control center while stopped, parked or in motion.

4. The surveillance and detection system according to claim 1, wherein at least one of the smart sensors is a radar and a Light Detection and Ranging (LIDAR) sensor.

5. The surveillance and detection system according to claim 1, wherein the at least one video camera and the at least one microphone of the surveillance and detection system are configured to detect sounds in 360 degrees around the autonomous patrol vehicle.

6. The surveillance and detection system according to claim 1, wherein the autonomous patrol vehicle has a length of 2.65 meters, a height of 1.65 meters and a width of 1.3 meters and is moved by a truck.

7. The surveillance and detection system according to claim 1, wherein the autonomous patrol vehicle is self-deployed from a command control center.

8. The surveillance and detection system according to claim 7, wherein the autonomous patrol vehicle comprises a battery and the autonomous patrol vehicle is charged with a battery charging system.

9. The surveillance and detection system according to claim 1, wherein the surveillance and detection system further comprises a speaker and is used by the processor to fully automate remote communication with a command control center or any desired location or site.

10. The surveillance and detection system according to claim 1, wherein the processor of the surveillance and detection system accesses a wireless communication system to obtain the live video feed and provide the two-way audio system and communicate the automated alarm to the first responder.

\* \* \* \* \*